(12) United States Patent
Chang et al.

(10) Patent No.: US 8,095,944 B2
(45) Date of Patent: Jan. 10, 2012

(54) SLOT-IN OPTICAL DISK DRIVE

(75) Inventors: Yu-Ming Chang, Guishan Shiang (TW);
Yu-Sheng Wang, Guishan Shiang (TW);
Jen-Chen Wu, Guishan Shiang (TW)

(73) Assignee: Quanta Storage Inc., Taoyuan County (TW)

( * ) Notice: Subject to any disclaimer, the term of this patent is extended or adjusted under 35 U.S.C. 154(b) by 427 days.

(21) Appl. No.: 12/492,687

(22) Filed: Jun. 26, 2009

(65) Prior Publication Data

US 2010/0077414 A1 Mar. 25, 2010

(30) Foreign Application Priority Data

Sep. 23, 2008 (TW) .............................. 97136580 A

(51) Int. Cl.
*G11B 17/051* (2006.01)
*G11B 17/04* (2006.01)
(52) U.S. Cl. ...................................... 720/622
(58) Field of Classification Search .................. 720/616, 720/617, 619–625
See application file for complete search history.

(56) References Cited

U.S. PATENT DOCUMENTS

| 5,416,763 | A * | 5/1995 | Ohsaki ........................... 720/623 |
| 7,900,220 | B2 * | 3/2011 | Chiou et al. ................... 720/622 |
| 2004/0022160 | A1 * | 2/2004 | Takai et al. ................... 369/77.1 |
| 2008/0271063 | A1 * | 10/2008 | Yamanaka et al. ............. 720/672 |

* cited by examiner

*Primary Examiner* — Will J Klimowicz
(74) *Attorney, Agent, or Firm* — Rabin & Berdo, PC

(57) ABSTRACT

A slot-in type disk drive fastens a clamping unit with two protrusions around its periphery on the central hole of a base plate. A front positioning part utilizes a stick to link a front right positioning bar and a front left positioning bar to synchronously open or close. A locking rod has a limiting pin inserted into an arc slot on the side of the base plate, and protrudes a locking end from the rear end. A rear positioning part utilizes an idle gear to link rear right and rear left positioning bars to synchronously open or close. The locking end can insert a first or second positioning recess on the rear left positioning bar and a touch block of the locking rod leans against the first protrusion. A lever is disposed on the rear right positioning bar to link a linkage plate set by one end.

16 Claims, 11 Drawing Sheets

SLOT-IN OPTICAL DISK DRIVE

This application claims the benefit of Taiwan application Serial No. 97136580, filed Sep. 23, 2008, the subject matter of which is incorporated herein by reference.

BACKGROUND OF THE INVENTION

1. Field of the Invention

The invention relates in general to a slot-in optical disk drive, and more particularly to a slot-in optical disk drive using a positioning device to guide disks of different sizes to be inserted or ejected.

2. Description of the Related Art

Optical disk drives are generally categorized as tray type and slot-in type according to the way the disk is inserted. A tray type optical disk drive uses a tray to hold the disk, so that the tray is slid in or out the disk drive for inserting or ejecting the disk. As to the slot-in optical disk drives, the disk is directly inserted in the slot of the optical disk drive, and a slot-loading mechanism draws in the disk automatically and guides the disk to be positioned, which is easier to operate.

Slot-in type optical disk drives use a roller, a lever or a transmission belt to suck in or eject the disk automatically. In the prior art disclosed in U.S. Pat. No. 6,512,730, a disk is inserted in or ejected through a roller. Several guiding rods and linkage mechanisms are used for guiding disks of different sizes to be inserted or ejected. However, the guiding rods and linkage mechanisms of the slot-in optical disk drive have to guide the disk continuously during the whole insertion or ejection process. As a result, the linkage mechanisms are complicated and hard to assemble. Furthermore, it is difficult to reduce the thickness of the optical disk drive because the mechanisms overlap with each other. Therefore, there are still unsolved problems in the positioning device of the conventional slot-in optical disk drive.

SUMMARY OF THE INVENTION

An object of the invention is directed to a slot-in optical disk drive. A positioning device driven by a protrusion drive mechanisms to position a disk. The structure and action are simplified accordingly.

Another object of the invention is directed to a slot-in optical disk drive. A linkage mechanism is single layer. Therefore, the thickness of the positioning device is decreased so that the thickness of the optical disk drive is reduced as well.

A further object of the invention is directed to a slot-in optical disk drive. The linkage mechanism of the positioning device is strengthened. As a result, the positioning device can be made of plastic material so that the sliding friction between parts is reduced. The weight and the manufacturing cost are lowered accordingly.

According to the present invention, a slot-in optical disk drive is provided. A clamping unit is fastened around a central hole of a base plate. Two protrusions are disposed around the periphery. A front positioning part is disposed on the front end of the base plate. A linking rod links a front right positioning bar and a front left positioning bar to open and close synchronously. A limiting pin on one end of a locking rod inserts into an arc slot on a side of the base plate. A locking end protrudes from the rear end. A rear positioning part is fastened on the rear of the base plate. A rear right positioning bar and a rear left positioning bar open and close synchronously through idle gears. A first positioning recess and a second positioning recess are formed on the rear left positioning bar. The locking end engages with the first positioning recess so that a touch block of the locking rod leans against a side of the first protrusion. A lever is disposed on the rear right positioning bar. One end of the lever links a linkage plate set.

A limiting block set is disposed on the base plate near the front right arc slot and the front left arc slot to fasten and limit the linking rod to move laterally. Front-rear sliding slots are formed on both ends of the linking rod. A pin is disposed on and protrudes from the rear end of the front right positioning bar and the front left positioning bar respectively and engages with the sliding slot. A pivot fastened on the base plate is disposed on the front right positioning bar and the front left positioning bar. The pivot of the front right positioning bar is in front of the pin, and the pivot of the front left positioning bar is behind the pin. As a result, the front right positioning bar and the front left positioning bar open and close synchronously through the linking rod.

The edge of a large size disk contacts the limiting pin of the locking rod of the present invention to drive the locking rod to rotate. As a result, the locking end is separated from the first positioning recess, and it is determined that a large size disk is inserted. The rear positioning part is released. The rear positioning part rotates and opens synchronously. The locking end moves along the front edge of the rear left positioning bar and engages with the second positioning recess. Accordingly, the rear positioning part is locked to hold the large size disk. The linkage plate set is driven to rotate the clamping unit. The first protrusion of the clamping unit pushes away the touch block of the locking rod. The locking rod rotates to separate the limiting pin from the edge of the disk and separate the locking end from the second positioning recess. The second protrusion of the clamping unit pushes outward the rear left positioning bar. The rear right positioning bar linking to the rear left positioning bar opens slightly more so that the rear guiding pins of the rear left positioning bar and the rear right positioning bar are separated form the edge of the disk. The lever moves backward along with the rear right positioning bar so that the touch end is separated from the edge of the disk.

The small size disk can not reach the limiting pin of the locking rod of the present invention. The locking end engages with the first positioning recess, and it is determined that a small size disk is inserted. The locking end engages with the first positioning recess, and the rear positioning part is locked and not able to rotate synchronously. The rear guiding pins of the rear right positioning bar and the rear left positioning bar lean against the inner sides of the rear right arc slot and the rear left arc slot for holding a small size disk.

The invention will become apparent from the following detailed description of the preferred but non-limiting embodiments. The following description is made with reference to the accompanying drawings.

DETAILED DESCRIPTION OF THE INVENTION

A preferred embodiment is described as follows with reference to the accompanying drawings to illustrate the technical means adopted by the present invention to achieve above object and the effect thereof.

Figure 1:
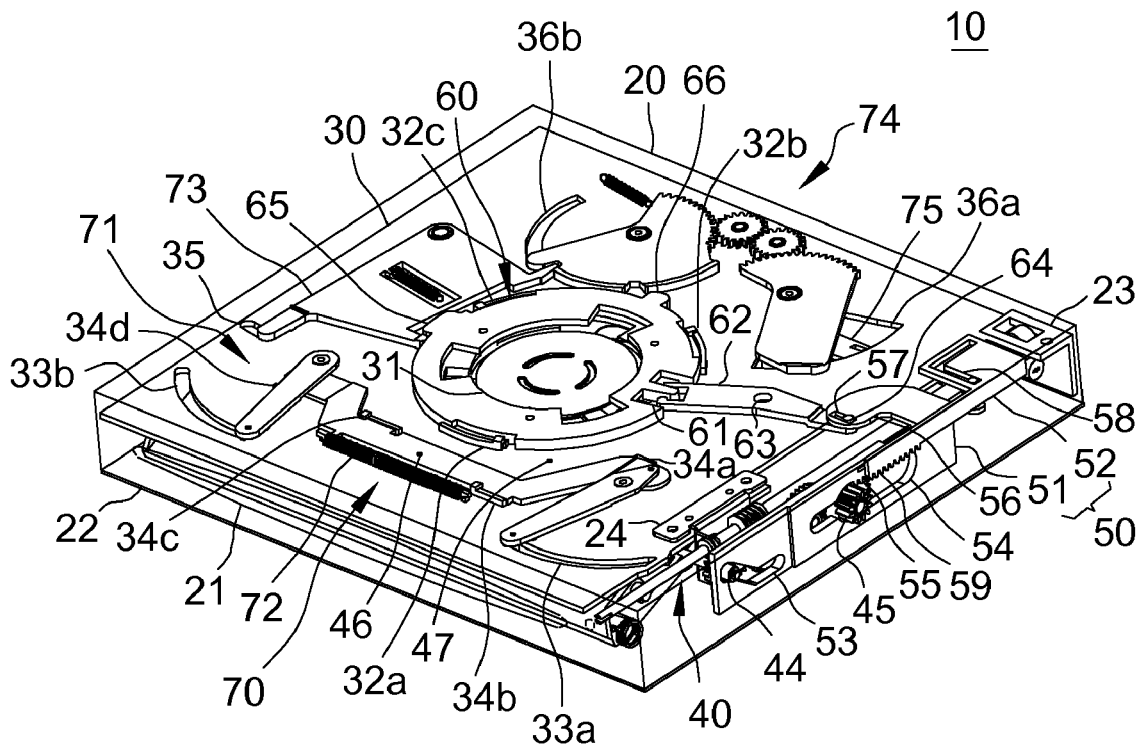
FIG. 1 shows a perspective view of a slot-in optical disk drive of the present invention.

Please refer to FIG. 1, which illustrates a slot-in optical disk drive 10 of the present invention. The slot-in disk drive 10 mainly includes a casing 20, a base plate 30, a transmission unit 40, a linkage plate set 50, a clamping unit 60 and a positioning device 70. The casing 20 is hollow. An opening 21, which is a long slit, is formed on the front so that a disk can be inserted or ejected. The bottom of the casing 20 is a bottom plate 22. A fastening bracket 23 is disposed on the bottom plate 22 on the rear of the casing 20. A bracket 24 is disposed on the bottom plate 22 and protrudes upwards from a side of the bottom plate 22.

A base plate 30 is disposed in the casing 20 of the optical disk drive 10 and above the bottom plate 22. A disk is inserted or ejected between the bottom plate 22 and the base plate 30. A central hole 31 is at the center of the base plate 30. A block set includes several arc blocks 32a, 32b and 32c which are disposed around the periphery of the central hole 31 and apart from the central hole 31 by a certain distance. A front right arc slot 33a and a front left arc slot 33b are symmetrically formed on both sides of the base plate 30 and near the front of the base plate 30. A limiting block set includes several lateral limiting blocks 34a, 34b, 34c and 34d. The limiting blocks 34a, 34b, 34c and 34d are disposed on the upper surface of the base plate 30 near the front right arc slot 33a and the front left arc slot 33b. A shorter arc slot 35 is formed on a side of the base plate 30 and near the middle side of the base plate 30. Also, the arc slot 35 is adjacent to the rear end of the arc slot 33b. A rear right arc slot 36a and a rear left arc slot 36b are symmetrically formed on two sides of the base plate 30 and near the rear of the base plate 30. The dimension of the rear left arc slot 36b is greater than that of the rear right arc slot 36a.

Figure 2:
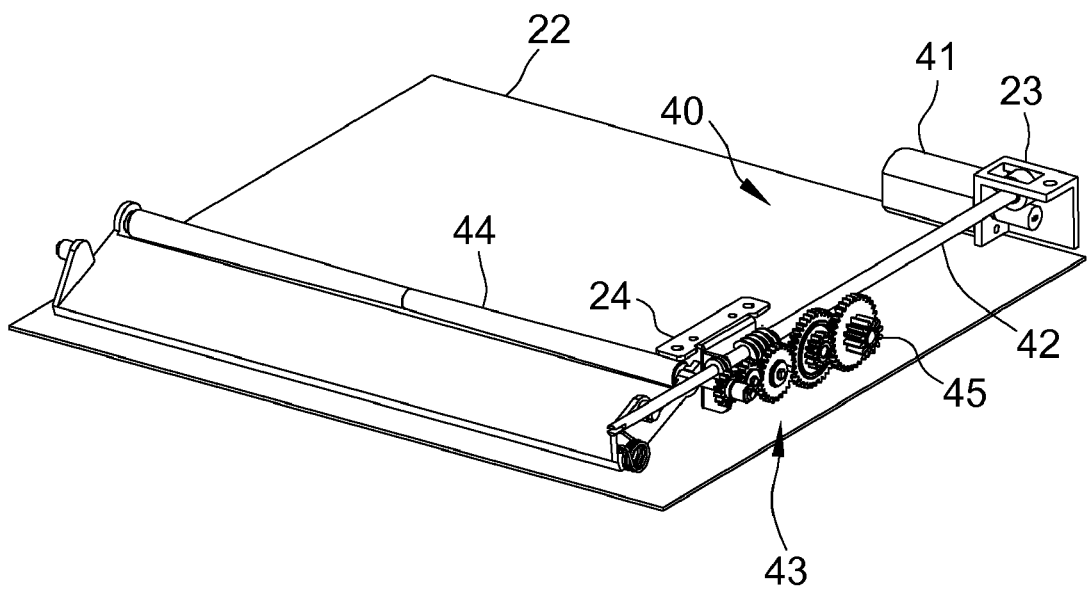
FIG. 2 shows a perspective view of the transmission unit of the present invention.

Please refer to FIG. 1 and FIG. 2 at the same time. FIG. 2 shows the transmission unit 40 of the present invention. The transmission unit 40 is disposed in the casing 20 and adjacent to a side of the base plate 30. The transmission unit 40 mainly includes a feeding motor 41, a transmission shaft 42, a gear unit 43 and a roller 44. The feeding motor 41 is fastened on the fastening bracket 23. The feeding motor 41 drives the gear unit 43 through the transmission shaft 42 fastened on the bracket 24. The gear unit 43 includes a series of gears meshing with each other. The roller 44 rotates on the front end of the gear unit 43, for inserting or ejecting a disk. The roller 44 is disposed between the bottom plate 22 and the base plate 30 and disposed laterally in the casing 20 near the slot 21. A sub-gear 45 links the rear end of the gear unit 43. An insertion sensor 46 is disposed under the base plate 30 and near the middle of the front end of the roller 44. The feeding motor 41 is activated when the insertion sensor 46 detects that a disk is inserted. An ejection sensor 47 is disposed under the base plate 30 and near the rear end of the roller 44. The feeding motor 41 is turned off when the ejection sensor 47 detects that a disk is at an ejection position.

Please refer to FIG. 1 again. The linkage plate set 50 disposed on a side of the casing 20 includes a large linkage plate 51 and a small linkage plate 52. An inclined slot 53 is formed on the front part of the large linkage plate 51. One end of the roller 44 is inserted in the inclined slot 53. As a result, when the large linkage plate 51 moves, the roller 44 is driven to ascend or descend by the inclined slot 53 for being in contact with or separated from the disk. A straight slot 54 is formed on the rear part of the large linkage plate 51. A large rack 55 is disposed on the upper edge of the straight slot 54. The sub-gear 45 engages with the straight slot 54. When the large linkage plate 51 does not move, the sub-gear 45 does not mesh with the large rack 55. When the large linkage plate 51 moves forward, the sub-gear 45 meshes with the large rack 55, so that the gear unit 43 drives the large linkage plate 51. A rod 56 is disposed on the rear end of the large linkage plate 51 and extends horizontally above the base plate 30. A hole 57 is formed on the extending end of the rod 56. The small linkage plate 52 is disposed behind the large linkage plate 51 and extends horizontally above the base plate 30. An L-shaped slot 58 is formed on the small linkage plate 52. A small rack 59 extends from the front end of the small linkage plate 52 and almost reaches the large rack 55. The small rack 59 is parallel to the large rack 55. The small linkage plate 52 does not mesh with the small rack 59 when not moving. When moving forward, the small linkage plate 52 meshes with the small rack 59, so that the gear unit 43 drives the small linkage plate 52.

The clamping unit 60 is basically shaped like a circular plate. Several arc blocks 32a, 32b and 32c are disposed around the periphery of the central hole 30 and apart from the central hole 30 by a certain distance. The arc blocks 32a, 32b and 32c are fastened around the central hole 30. The clamping unit 60 rotates within a limited range of angles along the block set. A combining recess 61 is formed concavely on the periphery of the clamping unit 60 to link one end of a connecting rod 62. A pivot 63 is disposed at the center of the connecting rod 62 and fastened on the base plate 30, so that the connecting rod 62 rotates around the pivot 63. A bolt 64 is disposed on the other end of the connecting rod 62. The bolt 64 is inserted in a straight hole 57 on an extending end of the rod 56. The rod 56 drives the connecting rod 62 to rotate the clamping unit 60. As a result, the clamping unit 60 is able to clamp or release a disk. A first protrusion 65 is formed on a side of the periphery of the clamping unit 60 and opposite to the combining recess 61. A second protrusion 66 is formed on the rear side of the periphery of the clamping unit 60.

Figure 3:
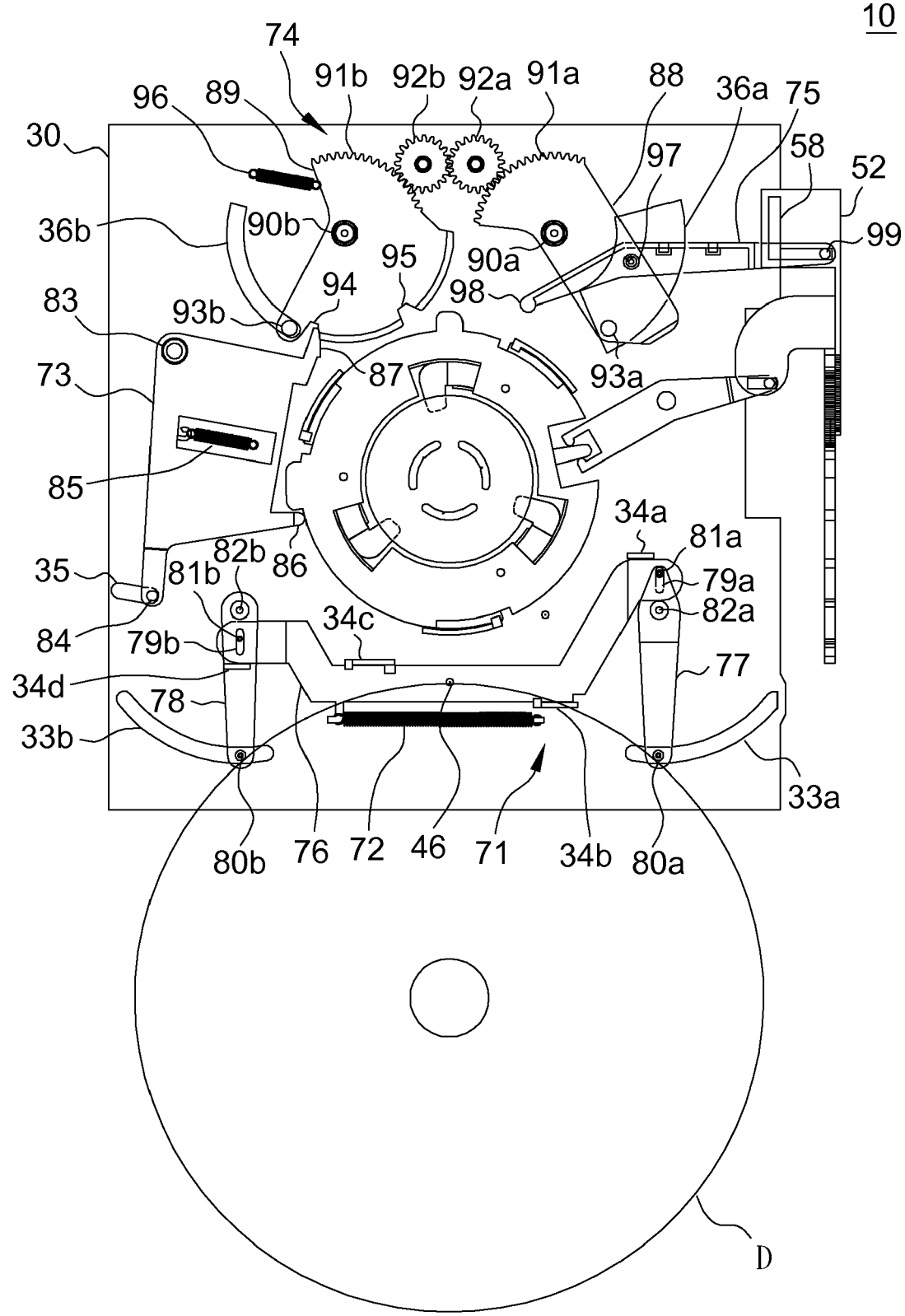
FIG. 3, FIG. 4, FIG. 5 and FIG. 6 show top views of the optical disk drive of the present invention during the insertion process of a large size disk.

Please refer to FIG. 1 and FIG. 3 at the same time. FIG. 3 illustrates an initial state of the slot-in optical disk drive 10. The positioning device 70 of the present invention mainly includes a front positioning part 71, a restoring spring 72, a locking rod 73, a rear positioning part 74 and a lever 75. The front positioning part 71 includes a linking rod 76, a front right positioning bar 77 and a front left positioning bar 78. Two ends of the linking rod 76 link the front right positioning bar 77 and the front left positioning bar 78. A limiting block set including limiting blocks 34a, 34b, 34c and 34d fastens the linking rod 76 on the front end of the base plate 30, so that the linking rod 76 only moves laterally along the limiting block set. Front-rear sliding slots 79a and 79b are formed on two ends of the linking rod 76. Front guiding pins 80a and 80b are respectively disposed on the front ends of the front right positioning bar 77 and the front left positioning bar 78 and insert into the front right arc slot 33a and the front left arc slot 33b respectively. The front guiding pins 80a and 80b reaches between the bottom plate 22 and the base plate 30 for guiding a disk D.

Pins 81a and 81b are disposed on the rear ends of the front right positioning bar 77 and the front left positioning bar 78 and respectively insert into the sliding slots 79a and 79b. are respectively disposed on the front right positioning bar 77 and the front left positioning bar 78 and fastened on the base plate 30. The pivot 82a of the front right positioning bar 77 is in front of the pin 81a. The pivot 82b of the front left positioning bar 78 is behind the pin 81b. As a result, the front right positioning bar 77 moves along with the front left positioning bar 78. When the linking rod 76 moves leftward, the front guiding pins 80a and 80b synchronously open along the front right arc slot 33a and the front left arc slot 33b and move toward both sides. One end of a restoring spring 72 is fastened on the linking rod 76, and the other end is fastened on the base plate 30. The elastic force makes the linking rod 76 lean against the right side, and the front guiding pins 80a and 80b respectively lean against the inner sides of the front right arc slot 33a and the front left arc slot 33b.

One end of the locking rod 73 is fastened on the base plate 30 by the pivot 83 near a side of the first protrusion 65 of the clamping unit 60. A limiting pin 84 is disposed and protrudes from the other end of the locking rod 73 and inserted into the arc slot 35. One end of a locking spring 85 is fastened on the locking rod 73, and the other end is fastened on the base plate 30. The elastic force makes the limiting pin 84 of the locking rod 73 lean against the right side of the arc slot 35. As a result, a touch block 86 on a side of the locking rod 73 leans against an outer side of the first protrusion 65. A locking end 87 protrudes from the rear of the locking rod 73.

The rear positioning part 74 includes a rear right positioning bar 88 and a rear left positioning bar 89. Pivots 90a and 90b respectively fasten the rear right positioning bar 88 and the rear left positioning bar 89 at the centers of the rear right arc slot 36a and the rear left arc slot 36b. Arc racks 91a and 91b are formed on the rear ends of the rear right positioning bar 88 and the rear left positioning bar 89. The rear right positioning bar 88 and the rear left positioning bar 89 open or close synchronously through idle gears 92a and 92b fastened on the base plate 30 and meshing with the arc racks 91a and 91b. Rear guiding pins 93a and 93b are disposed and protrude from the front ends of the rear right positioning bar 88 and the rear left positioning bar 89. The rear guiding pins 93a and 93b respectively inserts into the rear right arc slot 36a and the rear left arc slot 36b and reaches between the bottom plate 22 and the base plate 30, for guiding a disk D to be positioned on the rear end. A first positioning recess 94 and a second positioning recess 95 are formed concavely on the arc edge of the front end of the rear left positioning bar 89. A positioning spring 96 is disposed on the rear left positioning bar 89, and the elastic force makes the rear left positioning bar 89 lean against the inner side of the rear left arc slot 36b. During the rear left positioning bar 89 moving, the rear right positioning bar 88 leans against the inner side of the rear right arc slot 36a. The locking end 87 of the locking rod 73 engages with the first positioning recess 94. The pivot 97 of the lever 75 is disposed on the rear right positioning bar 88. The lever 75 is able to rotate relatively to the rear right positioning bar 88 and moves along with the rear right positioning bar 88. One end of the lever 75 extends to the inner side of the slot-in optical disk drive and forms a touch end 98. A sliding bolt 99 is formed on and protrudes from the other end of the lever 75. The sliding bolt 99 inserts into an L-shaped slot 58 of the small linkage plate 52. Accordingly, the slot-in optical disk drive is in the initial state as shown in FIG. 3.

FIG. 3, FIG. 4, FIG. 5 and FIG. 6 illustrate the optical disk drive of the present invention during the insertion process of a large size disk. FIG. 3 illustrates the slot-in optical disk drive when a large size optical disk D is inserted. Right after the sensor 46 detects the disk D, the feeding motor 41 is activated and drives the roller 44 to draw in the disk D. The front edge of the disk D pushes the front guiding pins 80a and 80b of the front positioning part 71 which open and close synchronously. The center of the disk D is guided to be aligned with the central hole 31. The front right positioning bar 77 and the front left positioning bar 78 open synchronously due to the pushing force of the roller 44. As a result, the linking rod 76 is limited by the limiting blocks 34a, 34b, 34c and 34d to slide leftward against the restoring spring 72.

Figure 4:
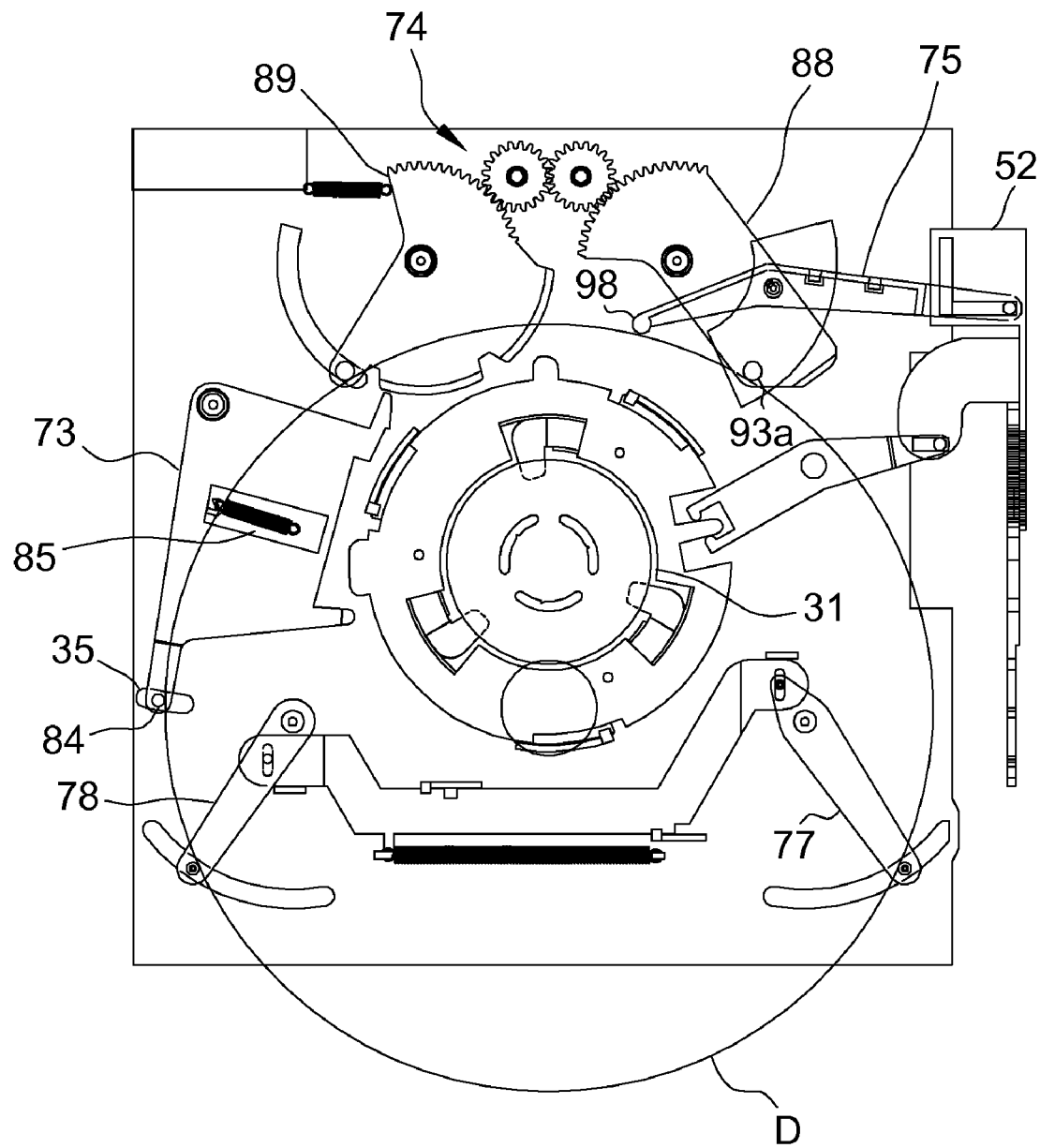

Then, as shown in FIG. 4, the front right positioning bar 77 and the front left positioning bar 78 open synchronously after the disk D enters the slot-in optical disk drive. The edge of the large size disk D contacts the limiting pin 84 of the locking rod 73, so that the limiting pin 84 moves toward the outer side of the arc slot 35. As a result, the locking rod 73 rotates against the limiting spring 85, which makes the locking end 87 separated from the first positioning recess 94. It is determined that the large size disk D is inserted. The rear positioning part 74 is released and then opens synchronously to hold the large size disk D. Then, the rear edge of the disk D touches the rear guiding pins 93a and 93b which are symmetrically disposed and protrude from the rear right positioning bar 88 and the rear left positioning bar 89. Accordingly, the center of the disk D which is pushed continuously is aligned with the central hole 31 automatically. Meanwhile, the rear edge of the disk D contacts the touch end 98 of the lever 75.

Figure 5:
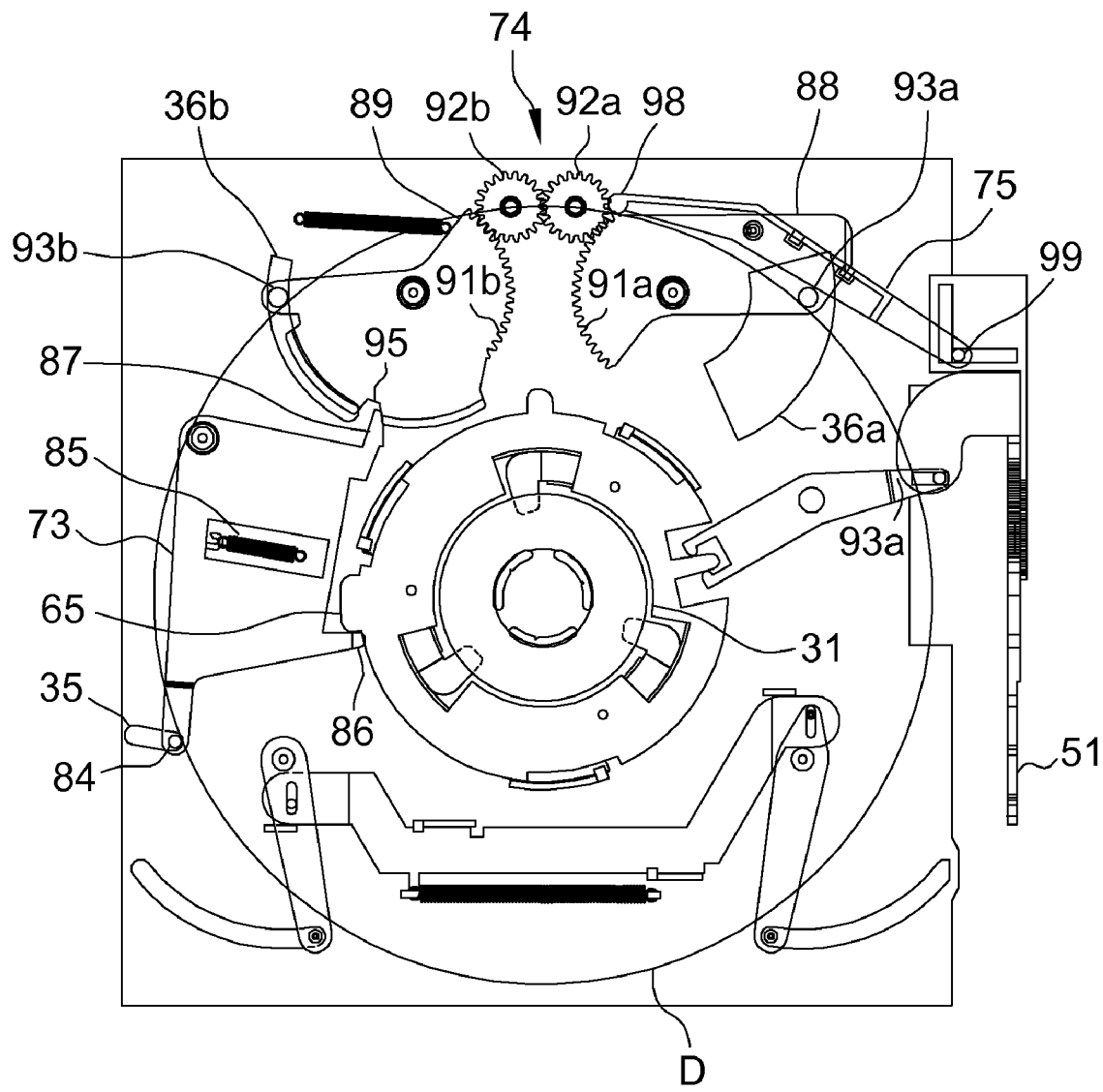

FIG. 5 illustrates the optical disk drive after the disk D is pushed continuously. The disk D pushes the rear guiding pins 93a and 93b to respectively move toward the back of the optical disk drive along the rear right arc slot 36a and the rear left arc slot 36b. As a result, the rear left positioning bar 89 moves against the positioning spring 96 and drives the rear right positioning bar 88 to open synchronously through the arc rack 91a, the idle gears 92a and 92b and the arc rack 91b. The rear right positioning bar 88 opens synchronously so that the disk D is able to move backward continuously. Meanwhile, after the limiting pin 84 of the locking rod 73 passes the maximum cross-sectional diameter of the of the disk D, the limiting pin 84 leans against the right side of the arc slot 35 due to the elastic force of the locking spring 85. The touch block 86 leans against an outer side of the first protrusion 65. The locking end 87 moves along the front edge of the rear left positioning bar 89 and engages with the second positioning recess 95. As a result, the rear positioning part 74 is locked and not able to rotate. The rear guiding pins 93a and 93b guide the center of the disk D to be aligned with the central hole 31. The lever 75 moves along with the rear right positioning bar 88. After the disk D pushes the touch end 98, a sliding bolt 99 on the other end of the lever 75 moves forward to contact the large linkage plate 51.

Figure 6:
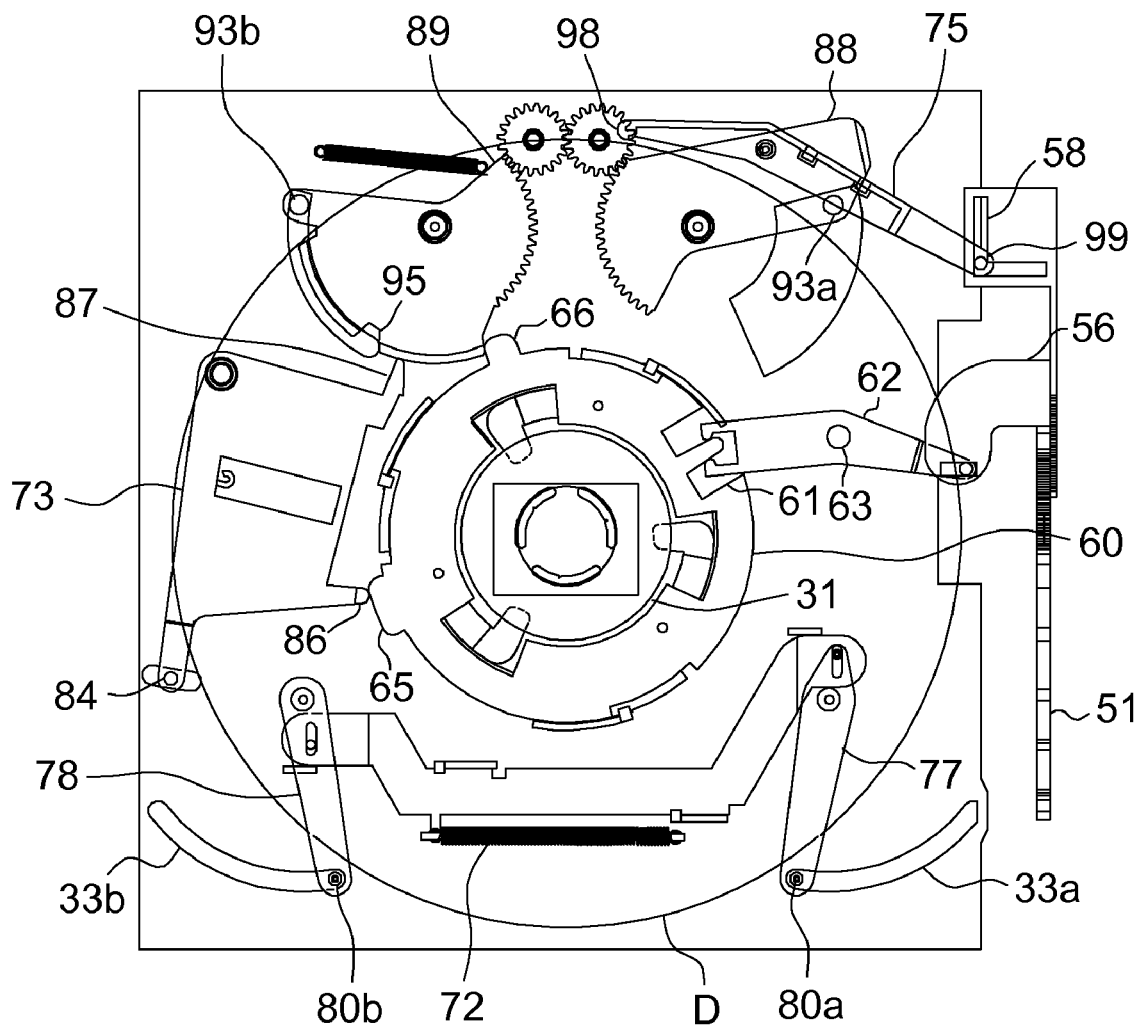

FIG. 6 illustrates the slot-in optical disk drive after the large linkage plate 51 is pushed forward by the sliding bolt 99. The large rack 55 of the straight slot 54 engages with the sub-gear 45, so that the gear unit 43 drives the large linkage plate 51 (please refer to FIG. 1) continuously. The rod 56 of the large linkage plate 51 drives the connecting rod 62 to rotate around the pivot 63. The clamping unit 60 rotates through the combining recess 61 to clamp the disk D. Meanwhile, the first protrusion 65 of the clamping unit 60 pushes the touch block 86 of the locking rod 73. The locking rod 73 rotates accordingly so that the limiting pin 84 is separated from the edge of the disk D, and the locking end 87 is separated from the second positioning recess 95. Then, the second protrusion 66 of the clamping unit 60 pushes outward the rear left positioning bar 89 which drives the rear right positioning bar 88. As a result, the rear right positioning bar 88 opens slightly more so that the rear guiding pins 93a and 93b are separated from the edge of the disk D. The lever 75 moves a little backward along with the rear right positioning bar 88. The sliding bolt 99 is limited by the L-shaped guiding slot 58, and the touch end 98 is separated from the edge of the disk D. Furthermore, after the disk D passes through the front right positioning bar 77 and the front left positioning bar 78, the front guiding pins 80*a* and 80*b* lean against the inner sides of the front right arc slot 33*a* and the front left arc slot 33*b* due to the elastic force of the restoring spring 72. As a result, the guiding pins 80*a* and 80*b* are separated from the edge of the disk D. The large linkage plate 51 moves forward, and the inclined slot 53 drives the roller 44 to descend and be separated from the disk D. The feeding motor 41 is turned off (please refer to FIG. 1) to finish the insertion of the large size disk D.

Figure 7:
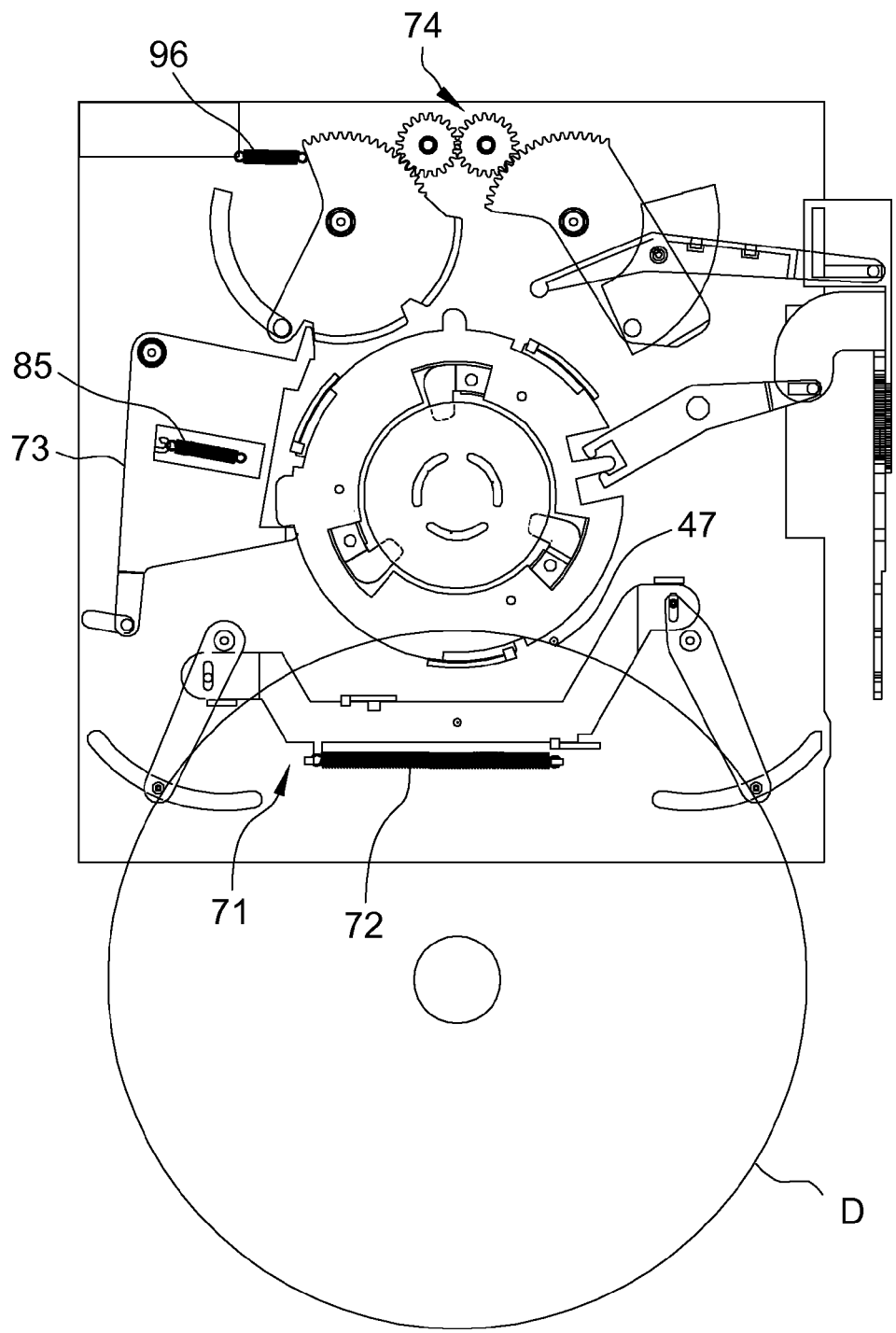
FIG. 7 shows a top view of the slot-in optical disk drive of the present invention when a large size disk is ejected completely.

When the large size disk D is ejected from the slot-in optical disk drive, the process is opposite to the above one. The order is from FIG. 6 back to FIG. 4. The process is roughly described as follows. First, the feeding motor is activated and rotates reversely. Then, the large linkage plate 51 moves backward, and the rollers ascends to touch the disk D. The clamping unit 60 rotates to release the disk D. The first protrusion 65 and the second protrusion 66 move so that the front positioning part 71, the locking rod 73 and the rear positioning part 74 contact the edge of the disk D to guide ejection. The disk D is ejected by the roller rolling reversely. FIG. 7 illustrates the slot-in optical disk drive of the present invention when the disk D is ejected completely. As shown in FIG. 7, after separated from the disk D, the rear positioning part 74 closes synchronously through the positioning spring 96. The locking rod 73 returns to the initial state through the locking spring 85. When the rear edge of the disk D leaves the ejection sensor 47, the feeding motor stops spinning. As a result, part of the disk D remains in the slot-in optical disk drive waiting to be taken out. After the disk D is taken away, the front positioning part 71 returns to the initial state through the restoring spring 72. Accordingly, the large size disk D is ejected completely.

Figure 8:
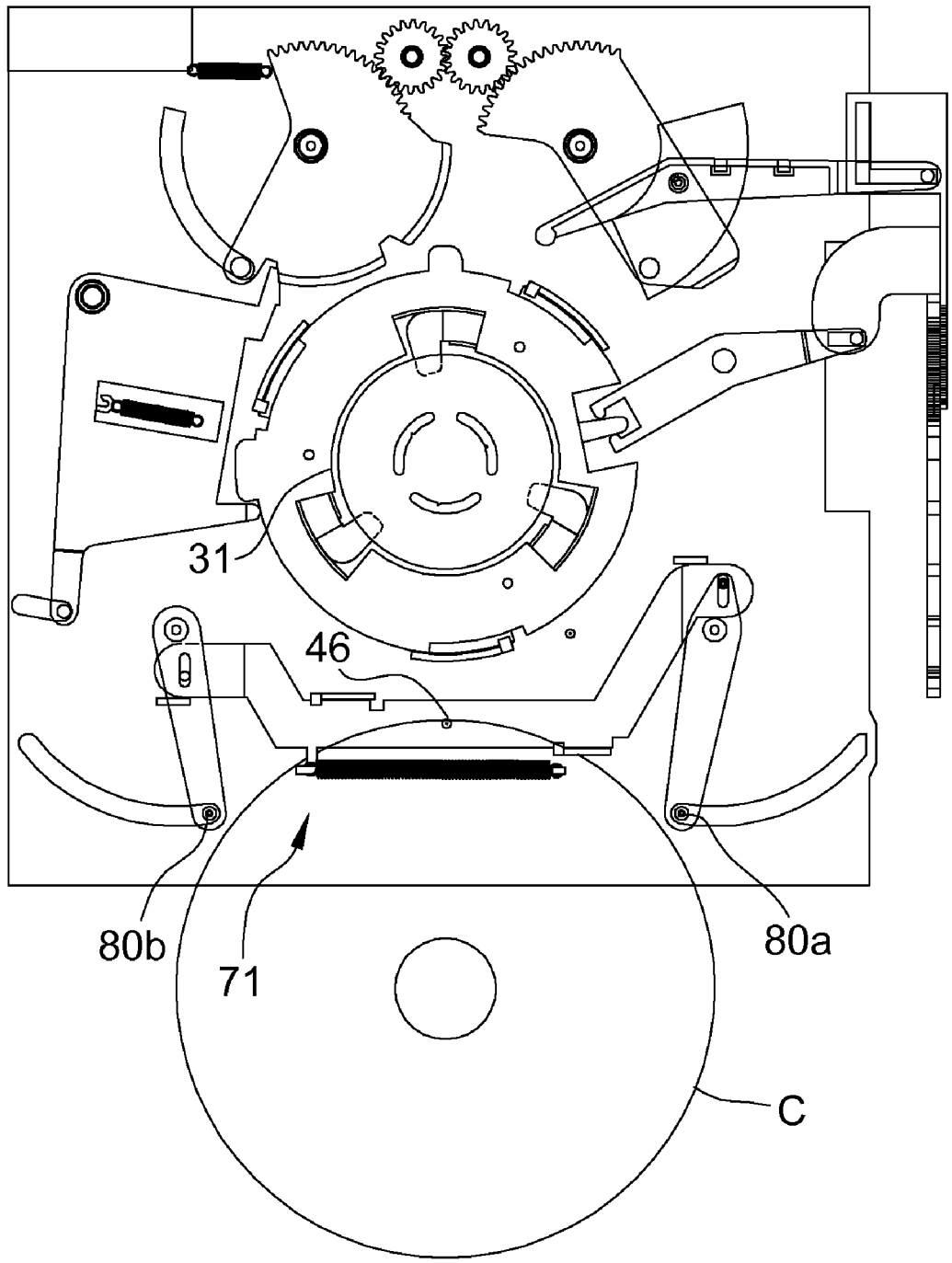
FIG. 8, FIG. 9, FIG. 10 and FIG. 11 show top views of the optical disk drive of the present invention during the insertion process of a small size disk.

FIG. 8, FIG. 9, FIG. 10 and FIG. 11 illustrate the optical disk drive of the present invention during the insertion process of a small size disk C. As shown in FIG. 8, when the insertion sensor 46 detects that the a small size disk C is inserted in the slot-in optical disk drive 10, the feeding motor 41 is activated. As a result, the roller 44 rolls to draw in the disk C (please refer to FIG. 1). The front edge of the disk C pushes the front guiding pins 80*a* and 80*b* of the front positioning part 71 which open and close synchronously, so that the center of the disk C is guided to be aligned with the central hole 31 automatically.

Figure 9:
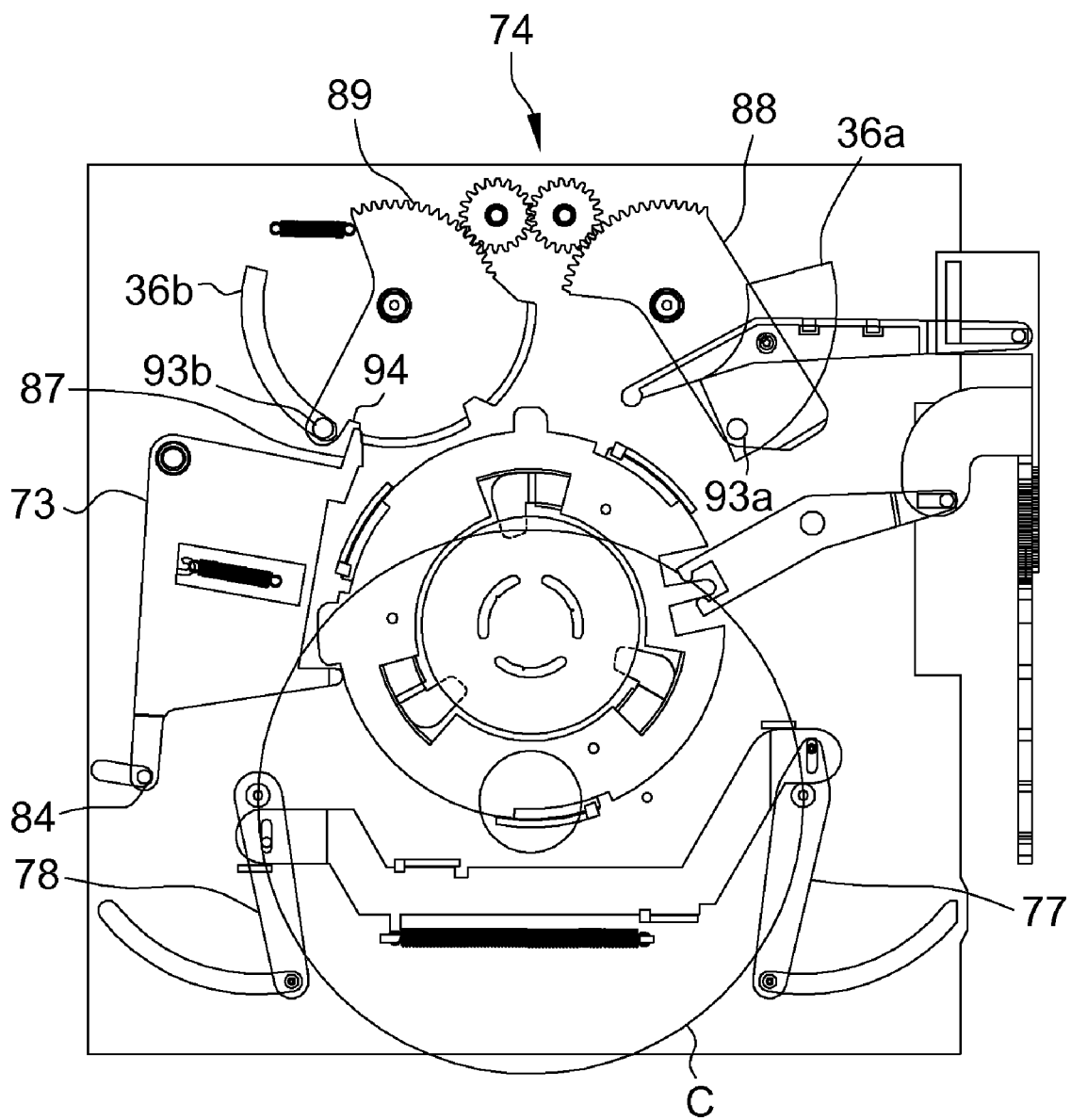
Figure 10:
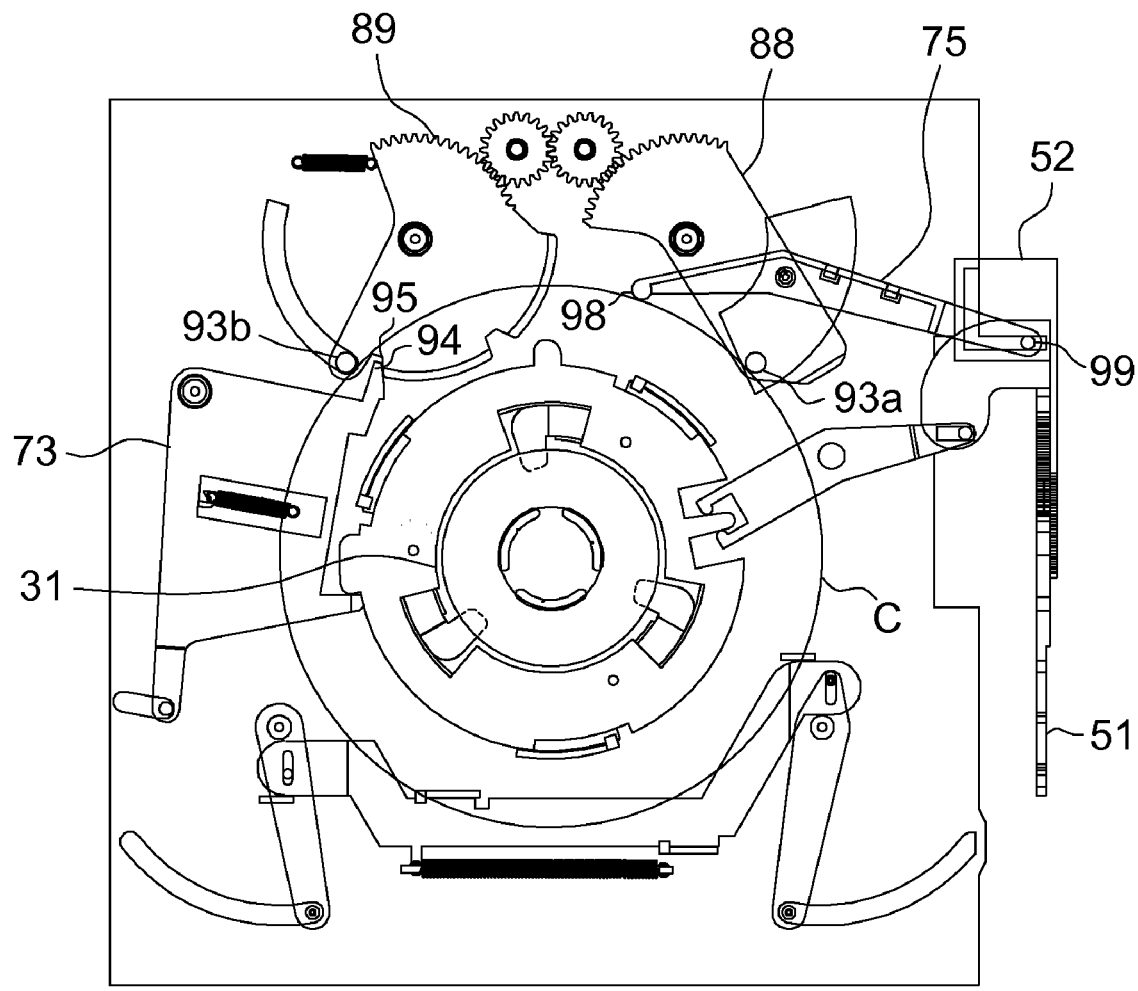

Next, as shown in FIG. 9, the front right positioning bar 77 and the front left positioning bar 78 opens synchronously due to the pushing force of the disk C through the roller. After the disk C passes, the front right positioning bar 77 and the front left positioning bar 78 are separated from the disk C and return to the initial state. The edge of the disk C can not reach the limiting pin 84 of the locking rod 73 because the diameter is smaller. As a result, the locking end 87 still engages with the first positioning recess 94. It is determined that a small size disk C is inserted. The rear positioning part 74 is locked and can not rotate synchronously. The rear guiding pins 93*a* and 93*b* of the rear right positioning bar 88 and the rear left positioning bar 89 lean against the inner sides of the rear right arc slot 36*a* and the rear left arc slot 36*b* for holding the small size disk C. As shown in FIG. 10, the rear edge of the disk C which is pushed continuously contacts the rear guiding pins 93*a* and 93*b* symmetrically disposed on and protruding from the front edges of the rear right positioning bar 88 and the rear left positioning bar 89. The center of the disk C is guided to be aligned with the central hole 31. Meanwhile, the rear edge of the disk C pushes the touch end 98 of the lever 75. The sliding bolt 99 on the other end of the lever 75 moves the small linkage plate 52 forward to touch the large linkage plate 51.

Figure 11:
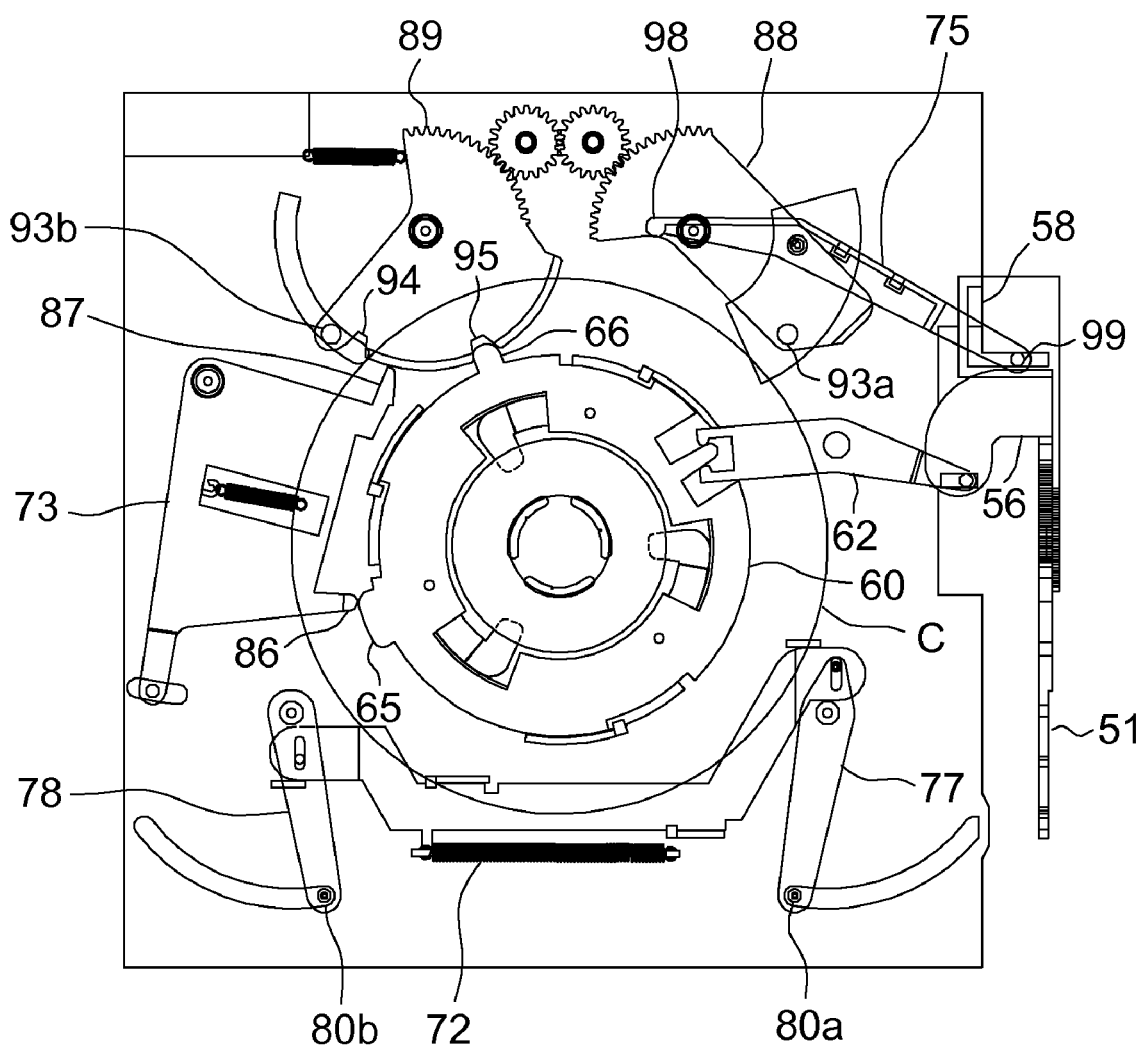

As shown in FIG. 11, the large rack 55 of the straight slot 54 of the large linkage plate 51 meshes with the sub-gear 45, so that the gear unit 43 drives the large linkage plate 51 (please refer to FIG. 1) continuously. The rod 56 of the large linkage plate 51 moving forward drives the connecting rod 62 to rotate. As a result, the clamping unit 60 rotates and clamps the disk C. Meanwhile, the first protrusion 65 of the clamping unit 60 pushes away the touch block 86 of the locking rod 73. The locking rod 73 rotates accordingly so that the locking end 87 is separated from the first positioning recess 94. Then, the second protrusion 66 of the clamping unit 60 engages with the second positioning recess 95. The rear left positioning bar 89 is pushed outward. The rear left positioning bar 89 drives the rear right positioning bar 88 and therefore opens slightly more. The rear guiding pins 93*a* and 93*b* are separated from the edge of the disk C as well. The lever 75 moves slightly backward along with the rear right positioning bar 88. The sliding bolt 99 is limited by the L-shaped slot 58 so that the touch end 98 is separated from the edge of the disk C. Moreover, after the disk C passes the front right positioning bar 77 and the front left positioning bar 78, the front guiding pins 80*a* and 80*b* respectively lean against the inner sides of the front right arc slot 33*a* and the front left arc slot 33*b* to be separated from the edge of the disk C due to the elastic force of the restoring spring 72. The large linkage plate 51 moves forward. The inclined slot 53 drives the roller 44 to descend. The roller 44 is separated from the disk C, and the feeding motor 41 (please refer to FIG. 1) is turned off. Accordingly, the small size disk C is ejected completely.

Figure 12:
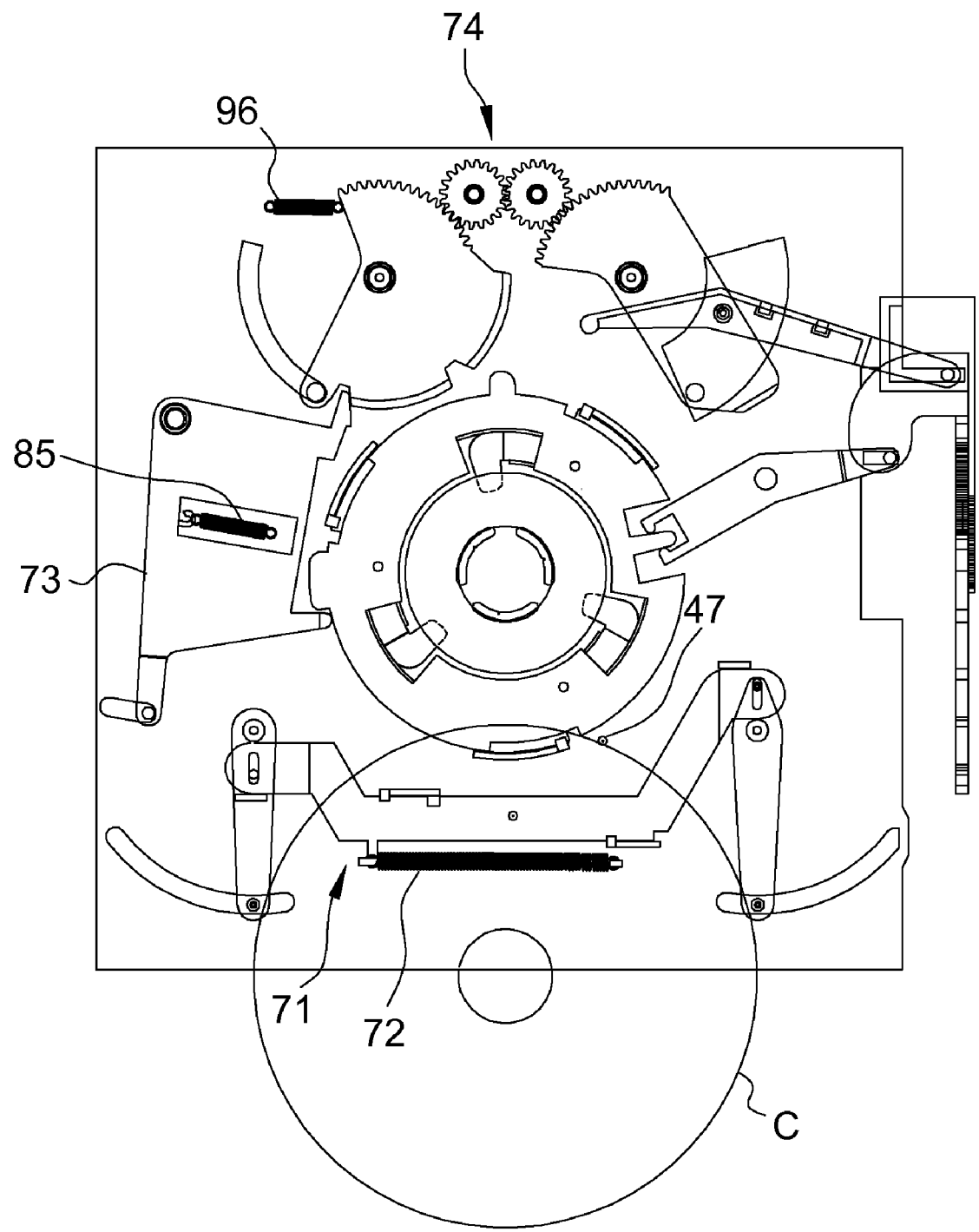
FIG. 12 shows a top view of the slot-in optical disk drive when a small size disk is ejected completely.

When a small size disk C is ejected from the slot-in optical disk drive, the process is opposite to the above one. The order is from FIG. 11 back to FIG. 9. First, the feeding motor is activated and spins reversely. Next, the large linkage plate 51 moves backward. The roller ascends to contact the disk C. The clamping unit 60 rotates to release the disk C. The first protrusion 65 and the second protrusion 66 move, so that the front positioning part 71, the locking rod 73 and the rear positioning part 74 guide the ejection. The roller rolling reversely ejects the disk C. FIG. 12 illustrates the slot-in optical disk drive when a small size disk C is ejected completely. After the disk C is ejected, the rear positioning part 74 closes synchronously through the positioning spring 96. The locking rod 73 returns to the initial state through the locking spring 85. When the rear edge of the disk C leaves the ejection sensor 47, the feeding motor stops spinning. Part of the disk C remains in the slot-in optical disk drive waiting to be taken out. After the disk C is taken away, the front positioning part 71 returns to the initial state through the restoring spring 72. Accordingly, the ejection of the small size disk C is completed.

Therefore, according to the insertion and ejection processes of the large size and small size disks of the slot-in optical disk drive of the present invention, the positioning device is driven by the protrusion of the clamping unit so that the locking rod is driven to lock the rear positioning part in position posture according to the size of the disk. The linking structure and action are simplified, and each mechanism is a single layer for reducing the thickness of the optical disk drive. Furthermore, the locking rod, rear positioning part and the front positioning part which are flat and strengthened can be made of plastic material when meeting the support strength of the simple linking mechanism. Therefore, the sliding friction between the parts is reduced. The weight and the manufacturing cost of the slot-in optical disk drive are decreased as well.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A slot-in optical disk drive comprising:
a base plate disposed in the slot-in optical disk drive, a central hole formed at the center of the base plate, an arc slot formed near the middle side of the base plate;
a transmission unit disposed on a side of the base plate to move a linkage plate set and drive a roller to roll, ascend and descend, the roller laterally disposed under the front end of the base plate;
a clamping unit fastened around the periphery of the central hole of the base plate, the clamping unit driven by the linkage plate set to rotate, a first protrusion formed on and protruding from a side of the periphery of the clamping unit, a second protrusion formed on the rear of the periphery of the clamping unit;
a front positioning part fastened on the front end of the base plate, both end of a linking rod driving a front right positioning bar and a front left positioning bar to open and close synchronously, a restoring spring fastened on the linking rod, an elastic force of the restoring spring making the front right positioning bar and the front left positioning bar lean against the inner side of the slot-in optical disk drive;
a locking rod fastened on the base plate through a pivot, a limiting pin disposed on, protruding from one end of the locking rod and inserted into the arc slot, a touch block disposed on a side of the locking rod, a locking end protruding from the rear of the locking rod, a locking spring fastened on the locking rod, an elastic force of the locking spring making the limiting pin of the locking rod lean against the inner side of the arc slot, so that the touch block leans against a side of the first protrusion;
a rear positioning part, a rear right positioning bar and a rear left positioning bar fastened on the rear of the base plate through pivots respectively, two arc racks disposed on the rear ends of the rear right positioning bar and the rear left positioning bar, and the arc racks are linked through idle gears, so that the rear right positioning bar and the rear left positioning bar open and close synchronously, a first positioning recess and a second positioning recess formed concavely on the front edge of the rear left positioning bar, a positioning spring fastened on the rear right positioning bar, an elastic force of the positioning spring making the rear right positioning bar linking the rear left positioning bar lean against the inner side of the slot-in optical disk drive, the locking end engaged with the first positioning recess; and
a lever with a pivot disposed on the rear right positioning bar, the lever moving along with the rear right positioning bar, a touch end extending to the inner side of the slot-in optical disk drive, the other end linking the linkage plate set.

2. The slot-in optical disk drive according to claim 1, wherein a block set is disposed around the periphery of the central hole for fastening and limiting the clamping unit to move along the block set.

3. The slot-in optical disk drive according to claim 1, wherein a front right arc slot and a front left arc slot are symmetrically formed on both sides of the base plate and near the front of the base plate, and two front guiding pins are respectively disposed on the front ends of the front right positioning bar and the front left positioning bar and engaged with the front right arc slot and the front left arc slot respectively.

4. The slot-in optical disk drive according to claim 3, wherein the elastic force of the restoring spring makes the front guiding pins of the front right positioning bar and the front left positioning bar lean against the inner sides of the front right arc slot and the front left arc slot.

5. The slot-in optical disk drive according to claim 3, wherein a limiting block set is disposed on the base plate near the front right arc slot and the front left arc slot, and the limiting block set fastens and limits the linking rod to move laterally along the limiting block set.

6. The slot-in optical disk drive according to claim 5, wherein two front-rear sliding slots are formed on both ends of the linking rod, two pins are respectively disposed on the rear ends of the front right positioning bar and the front left positioning bar and engaged with the sliding slots, two pivots are disposed on the front right positioning bar and the front left positioning bar and are fastened on the base plate, the pivot of the front right positioning bar is in front of the pin, the pivot of the front left positioning bar is behind of the pin, so that the front right positioning bar links the front left positioning bar through the linking rod to open and close synchronously.

7. The slot-in optical disk drive according to claim 1, wherein a rear right arc slot and a rear left arc slot are symmetrically formed on both sides of the base plate and near the rear of the base plate, rear guiding pins are disposed and protruding from the rear right positioning bar, and the rear left positioning bar and engaged with the rear right arc slot and the rear left arc slot.

8. The slot-in optical disk drive according to claim 1, wherein two idle gears are disposed between the arc racks of the rear right positioning bar and the rear left positioning bar for driving the rear right positioning bar and the rear left positioning bar, so that the rear right positioning bar and the rear left positioning bar moving together.

9. The slot-in optical disk drive according to claim 1, wherein an insertion sensor is disposed under the base plate and near the middle of the front end of the roller, and an ejection sensor is disposed near the rear end of the roller.

10. The slot-in optical disk drive according to claim 1, wherein the limiting pin of the locking rod is contacted by the edge of an inserted large size disk so as to drive the locking rod to rotate, so that the locking end is separated from the first positioning recess, and it is determined that a large size disk is inserted.

11. The slot-in optical disk drive according to claim 10, wherein the locking end is separated from the first positioning recess, the rear positioning part is released and rotated to open synchronously, the locking end is moved along the front edge of the rear left positioning bar and engaged with the second positioning recess, and the rear positioning part is locked to hold the large size disk.

12. The slot-in optical disk drive according to claim 11, wherein the disk contacts the touch end of the lever when the disk is positioned, for driving the linkage plate set.

13. The slot-in optical disk drive according to claim 12, wherein the linkage plate set is touched to rotate the clamping unit, the first protrusion of the clamping unit pushes away the touch block of the locking rod so as to rotate the locking rod, so that the limiting pin is separated from the edge of the disk, and the locking end is separated from the second positioning recess.

14. The slot-in optical disk drive according to claim 13, wherein the second protrusion of the clamping unit pushes outward the rear left positioning bar after the locking end is separated from the second positioning recess, and the rear right positioning bar drives the rear left positioning bar to open slightly more so that the rear guiding pins of the rear left positioning bar and the rear right positioning bar are separated from the edge of the disk, and drive the lever moves slightly backward along with the rear right positioning bar to separate the touch end from the edge of the disk.

15. The slot-in optical disk drive according to claim 1, wherein the edge of a small size disk can not reach the limiting pin, the locking end is engaged with the first positioning recess, and it is determined that a small size disk is inserted.

16. The slot-in optical disk drive according to claim 15, wherein the locking end is engaged with the first positioning recess so that the rear positioning part is locked and can not rotate synchronously, the rear guiding pins of the rear right positioning bar and the rear left positioning bar lean against the inner sides of the rear right arc slot and the rear left arc slot to hold a small size disk.

* * * * *